Patented June 30, 1942

2,288,414

UNITED STATES PATENT OFFICE 2,288,414

CONTROL SYSTEM FOR CLOSURES

Clifford Norton, Summit, N. J., and Philip Karmel, New York, N. Y., assignors to Otis Elevator Company, New York, N. Y., a corporation of New Jersey Application December 14, 1940, Serial No. 370,120

12 Claims. (Cl. 187—54)

The invention relates to control systems for closures, and especially to control systems for car gates and hatchway doors of elevator installations.

The invention is especially applicable to elevator installations in which each hatchway door is provided with an individual electric operating motor.

The object of the invention is to provide a control system for operating motors for closures which insures the desired control of the operation of the motors, which is safe and reliable in operation and which is economical to manufacture and install.

The invention will be described as applied to an installation having vertically sliding bi-parting counterbalanced hatchway doors. In carrying out the invention according to the arrangement which will be described, each hatchway door is provided with a direct current operating motor. Also a direct current operating motor is provided for the car gate. As the car comes to a stop at a floor, the hatchway door at that floor and car gate are opened automatically. Each hatchway door is provided with a lock which is released as the car comes to a stop at the floor at which the door is provided. Switching mechanism is associated with each door lock which acts to select for energization the armature and field winding of the hatchway door operating motor for the floor at which the stop is made, thereby insuring that only that one for such floor will be operated and that it will not be energized until the door is unlocked.

Control switching mechanism is provided for each door which operates as the door nears the position to which it is being moved to cause dynamic braking of the motor. Similar switching mechanism is provided for the car gate. Thus, the desired control of the speed of operation of the door and gate is assured. The coils of the switches causing the application of power to the door and gate operating motors are disconnected from their supply source as the door and gate respectively reach a point a certain distance from full open position. However, these switches are timed in dropping out to continue the application of power to the respective motors for a time ample for the opening operation to be completed. Should either the door or gate fail to reach full open position within this time interval, this opening operation may be completed by pressing a door open button, within the car or at the floor at which the stop is made.

The door and gate are closed by pressing and holding pressed a door close button, either in the car or at the floor at which the car is stopped. The closing operation may be stopped at any time by releasing this button and started again by pressing the button. Should the door or gate not have reached fully closed positon before the close button is released, it is dynamically braked and immediately brought to a stop upon release of the button, regardless of the position to which it has moved. Protective means are provided which act in case the door or gate does not reach the position to which it is being moved within a certain time interval to prevent further energization of the operating motor. In such event, in case of the closing operation, the door close button must be released and repressed to effect full closing while in case of the opening operation, the door open button must be pressed to effect full opening.

A general idea of the invention and of the mode of carrying it out which is at present preferred and various features and advantages of the invention will be gained from the above statements. Other features and advantages of the invention will be apparent from the following description and appended claims. Certain features of the invention are applicable to installations in which the car gate is manually operable or to installations in which no gate is provided. Also, certain features of the invention are applicable to installations in which alternating current operating motors are utilized and to installations in which more than one motor is employed for each door and for the car gate.

Figure 4:
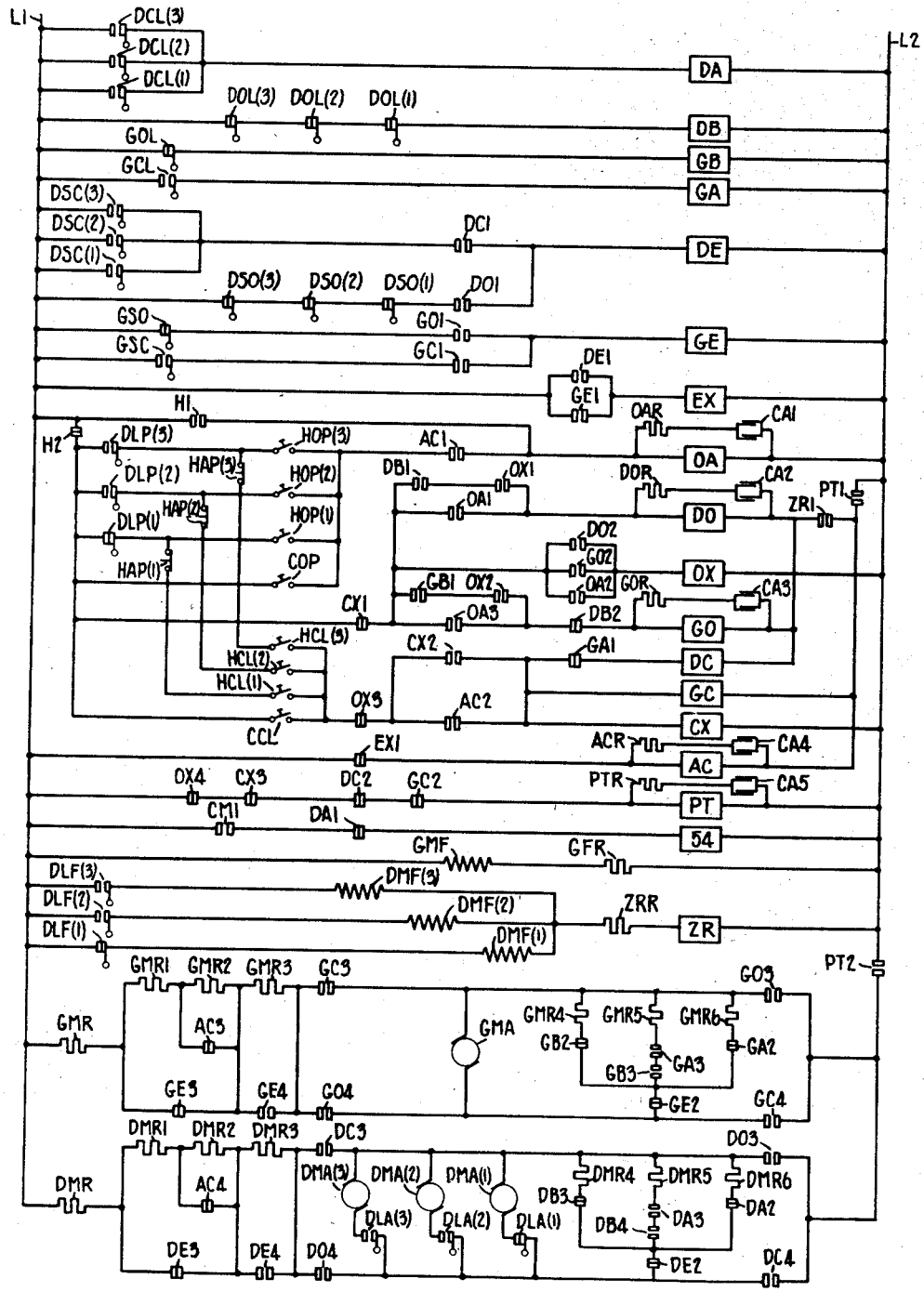
Figure 4S:
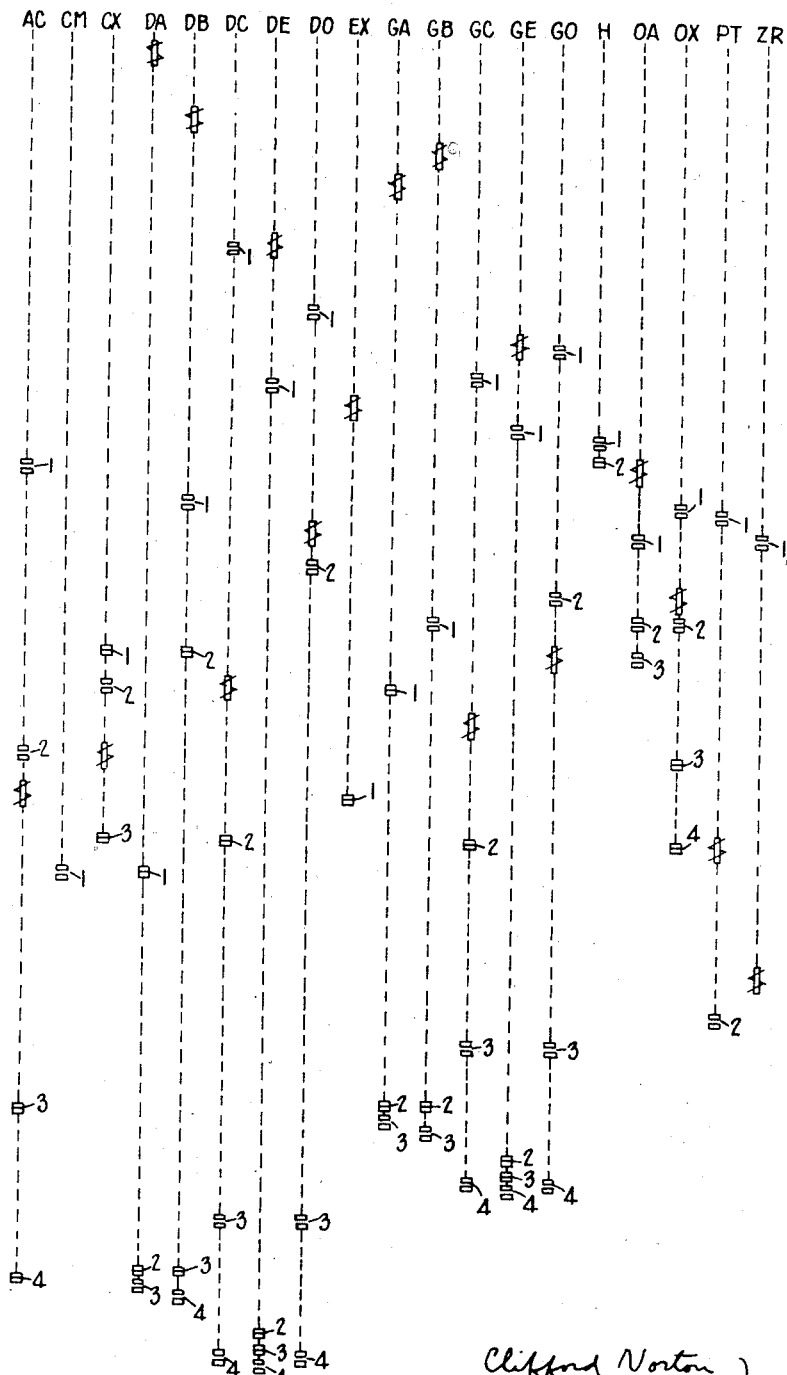

Figure 4 is a simplified wiring diagram of a control system for the operating motors for the hatchway doors at the various floors and for the operating motor for the car gate; and Figure 4s is a key sheet for Figure 4 showing the electromagnetic switches in spindle form with the contacts and coils arranged on the spindles in horizontal alignment with the corresponding contacts and coils of the wiring diagram.

Figure 1:
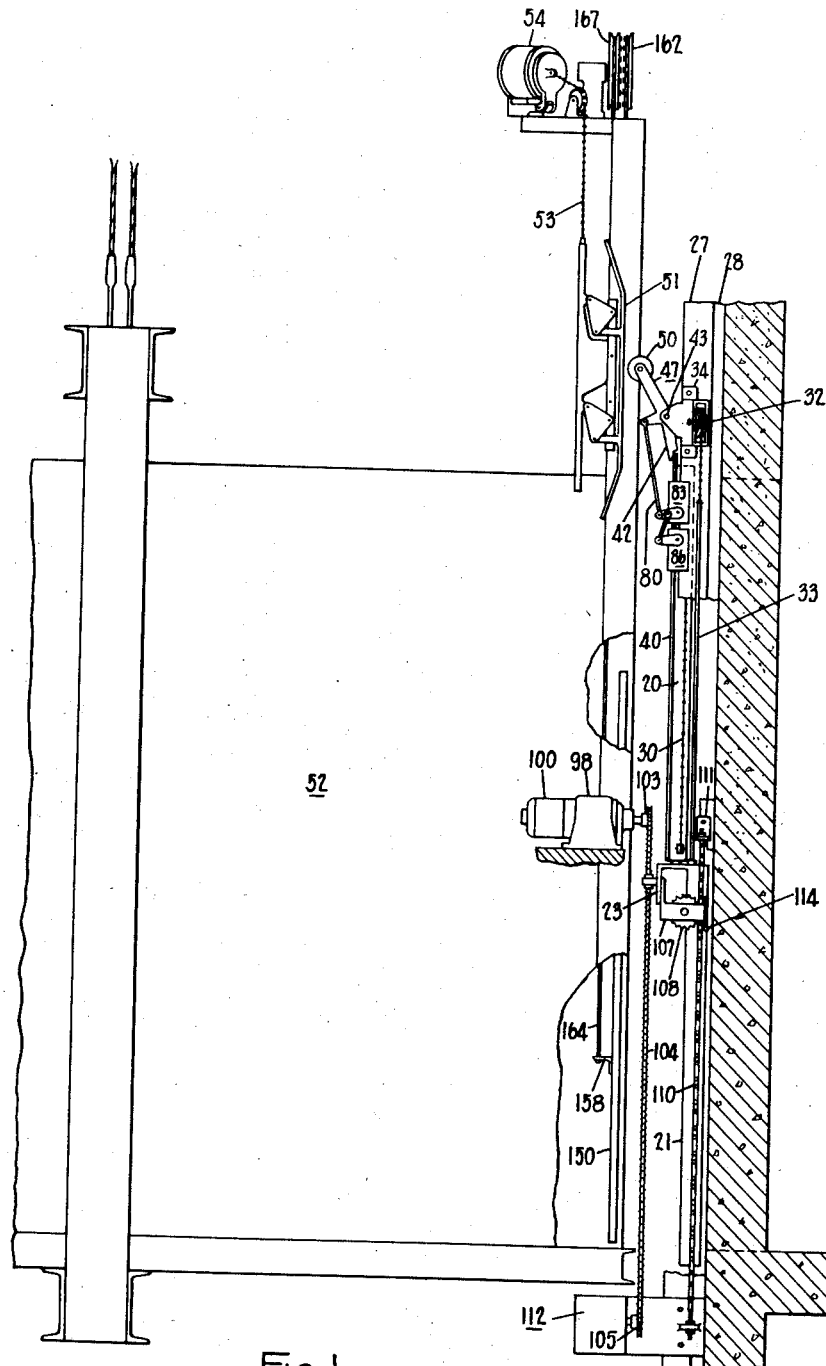
Figure 1 is a schematic representation in side elevation illustrating operating mechanism embodying the invention as applied to a vertical bi-parting counterbalanced pass type hatchway door and also illustrating locking mechanism for the door and a gate on the elevator car with operating mechanism therefor.
Figure 2:
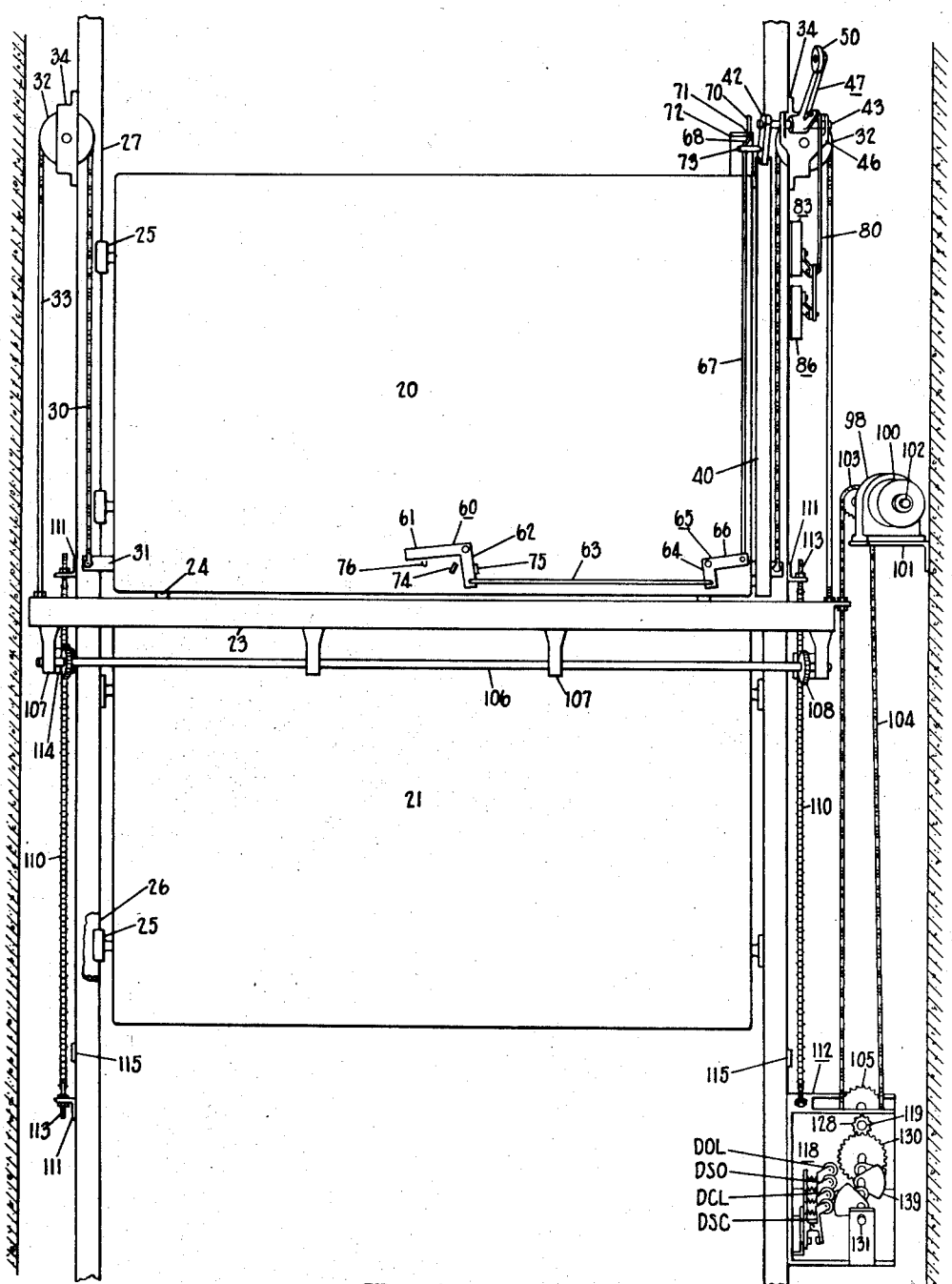
Figure 2 is a schematic representation in rear elevation of the hatchway door and operating mechanism therefor as illustrated in Figure 1 and also including the locking mechanism for the door.

Referring to Figures 1 and 2, the upper section of the door is designated 20 while the lower section is designated 21. The top of the lower section is provided with a truckable sill 23 illustrated in the form of an angle extending across the top of the section. The bottom of the upper section is provided with rubber bumpers 24 which rest on the top of the sill 23 when the door is closed. Each door section is provided with a plurality of guide shoes 25, two on each side thereof. The guide shoes for the lower section cooperate with guide rails 26 while those of the upper section cooperate with guide rails 27 to guide the section in its opening and closing movement. These guide rails are secured to angle members 28 in turn secured to the structural framework. The sections are connected together in counterbalancing relationship. This is effected on each side of the door by a chain 30, secured to a lug 31 on the bottom of the upper section, from which it extends upwardly and over sheave 32 and is connected through a rod 33 to the end of sill 23. The supporting bracket 34 for the sheave is mounted on angle member 28, an aperture being provided in this member and guide rails 26 and 27 to provide clearance for the sheave and through which the chain extends.

An elongated bar 40 is secured to the upper door section on the right hand side thereof as viewed in Figure 2. This bar serves as a lock bar, being engaged by the notched end of a latch lever 42 when the door is closed to lock the door sections against opening movement. This lever is secured to a pivot shaft 43 rotatably supported in the spaced arms of an extension 46 of bracket 34. Secured to shaft 43 is a bell crank lever 47, the upwardly extending arm of which carries an operating roller 50. This roller is adapted to be engaged by a cam 51, carried by the elevator car 52, to move the latch lever into position to disengage the lock bar and unlock the door. This cam is connected by a chain 53 to a magnet 54 which acts upon energization to move the cam to a retracted position as shown in which it clears the operating rollers 50 of the door locks during movement of the car.

The latch lever 42 may also be operated manually to disengage the lock bar and unlock the door. This is effected through a bell crank lever 60 pivotally mounted on the inside of the upper door section near the bottom and centrally of the door. One arm 61 of this lever serves as an operating handle. The other arm 62 is connected by a rod 63 to the arm 64 of a second bell crank lever 65 pivoted on the door section at the side near the lock bar. The other arm 66 of the second bell crank is connected to a vertical rod 67 which is bent inwardly near its upper end and then bent back to the vertical to form a cam 68. The upper end 70 of this rod extends through an aperture 71 in a bracket 72 secured to the top of the door section to guide the rod in its movement. A pin 73 is secured to latch lever 42 in the path of movement of cam 68. Stops 74 and 75 are provided to limit the movement of bell crank lever 60. To unlock the door manually from the inside of the car the lever 60 is pushed clockwise, as viewed in Figure 2, pulling down on rod 67. The cam 68 engages pin 73 to push the latch lever into position disengaging the lock bar. Continued pushing on lever 60 after it engages its stop 74 moves the door to open position. The door may also be unlocked from the outside by a special key which is inserted in an aperture 76 in the upper door section beneath the operating handle of lever 60 and utilized as a lever to push lever 60 into door unlocking position. This arrangement is usually provided only at the first floor.

The latch lever 42 is arranged to effect the operation of switching mechanism when the door is unlocked. This is effected through a link 80 adjustably connecting the other arm of bell crank lever 47 to the operating arm of a switch unit 83 secured to guide rail 27. To provide additional contacts an additional switch unit 86 is provided and secured to guide rail 27, the operating arm of this unit being adjustably connected to the arm of switch unit 83 by a link. The details of construction of the contacts of the switch units are not shown, the contacts being shown in Figure 4.

Contacts of the switch units control operation of a motor 100 which provides the power for moving the door sections to open and closed positions. The motor is geared down, gearing being provided within the casing 99. This motor unit is mounted on a bracket 101 secured to the hatchway wall at one side of the door. The motor operates through the gear reduction to drive a shaft 102 on the end of which is a sprocket 103. This sprocket drives a sprocket chain 104, one end of which is secured to the sill 23 from which the chain extends upwardly and over sprocket 103, thence downwardly and around another sprocket 105 and thence back to sill 23 to which the other end of the chain is secured. A shaft 106 extends across the lower door section beneath the truckable sill, being supported in bearing brackets 107 secured to the sill. On each end of this shaft is secured a sprocket 108 which meshes with a stationary chain 110. Each chain is secured to guide rail 27, the one on the left as viewed in Figure 2 by brackets 111 and the one on the right at the top by a bracket 111 and at the bottom by a casing 112 which will be referred to later. The connections are effected through eye bolts 113 in order that these chains may be adjusted and kept taut. These chains serve as racks upon which the sprockets 108 move during operation of the door and prevent tilting of the door about an axis perpendicular to the plane of the door. Each bracket 107 at the end of the shaft is provided with a shoe 114 for maintaining the sprocket in mesh with the chain. Stop plates 115 are secured to guide rails 27 in position to engage the ends of the truckable sill 23 when the door is open to support the lower door section with the sill aligned with the floor level.

Sprocket chain 104 acts through sprocket 105 to operate additional switching mechanism 118 for controlling operation of motor 100. This switching mechanism is arranged within casing 112 which is secured to guide rail 27. Sprocket 105 is secured to a shaft 119 rotatably mounted in the casing. The inner end of this shaft has a pinion 128 secured thereto. This pinion meshes with a gear 130 secured to a shaft 131 rotatably mounted in the casing. A plurality of cams 139 are mounted on this shaft for operating switches DSC, DCL, DSO and DOL mounted in the casing. Four of these switches are illustrated, each of them being of the same construction. The shape and setting of the cams is such as to provide the desired operation of the switches, as will be explained later.

In operation, as the car stops at a floor, magnet 54 is deenergized, permitting cam 51 to engage roller 50. This swings lever 47 clockwise, as viewed in Figure 1, disengaging the notched end of latch lever 42 from lock bar 40, unlocking the door. Also, certain contacts of the switch units 83 and 86 are engaged, causing energization of motor 100 for rotative movement of sprocket 103 counterclockwise as viewed in Figure 2. Sprocket 103 acts through chain 104 to pull down on the lower door section 21. Shaft 106 acts through sprockets 108 and rack chains 110 to transmit driving force to the other side of the lower section and obviate any tilting of the section on its guides during its movement. At the same time as the lower section is pulled down, the upper door section 20 is pulled upwardly through its connection to the lower section by its chains 30 and rods 33. Thus the two sections counterbalance each other, minimizing the load on the motor. The sections are brought to a stop upon the engagement of the truckable sill 23 with stop plates 115. During the door opening operation, motor 100 is controlled by switching mechanism 118, so as to be slowed down as the sections reach certain distances from open position.

To close the door the motor is energized for reverse rotative movement. Upon being so energized, it acts through chain 104 to pull up on the lower door section, driving force being transmitted to the other side of the door through shaft 106 as before. At the same time the upper section, being released by the upward movement of rods 33, closes by its own weight. The sections are brought to a stop upon the engagement of the bumpers 24 with the truckable sill. During the closing movement, the motor is controlled by switching mechanism 118 so as to be slowed down as the sections reach certain points in their closing movement.

One of the contacts of one of the switch units 83, 86 serves as an interlock to prevent the operating of the elevator hoisting motor to move the car unless the door is closed and locked. In this connection it is to be noted that the elongated lock bar 40, when the upper door section is out of closed position, is in the path of movement of latch 42, thus preventing lever 47 from swinging counterclockwise, as viewed in Figure 1, into position to effect the closure of the interlock contacts, if for any reason cam 51 should disengage roller 50, until the door reaches fully closed position. The door operating mechanism above described is the subject matter of the copending application of Norton, Karmel and Tucker, Serial Number 368,424, filed December 4, 1940.

Figure 3:
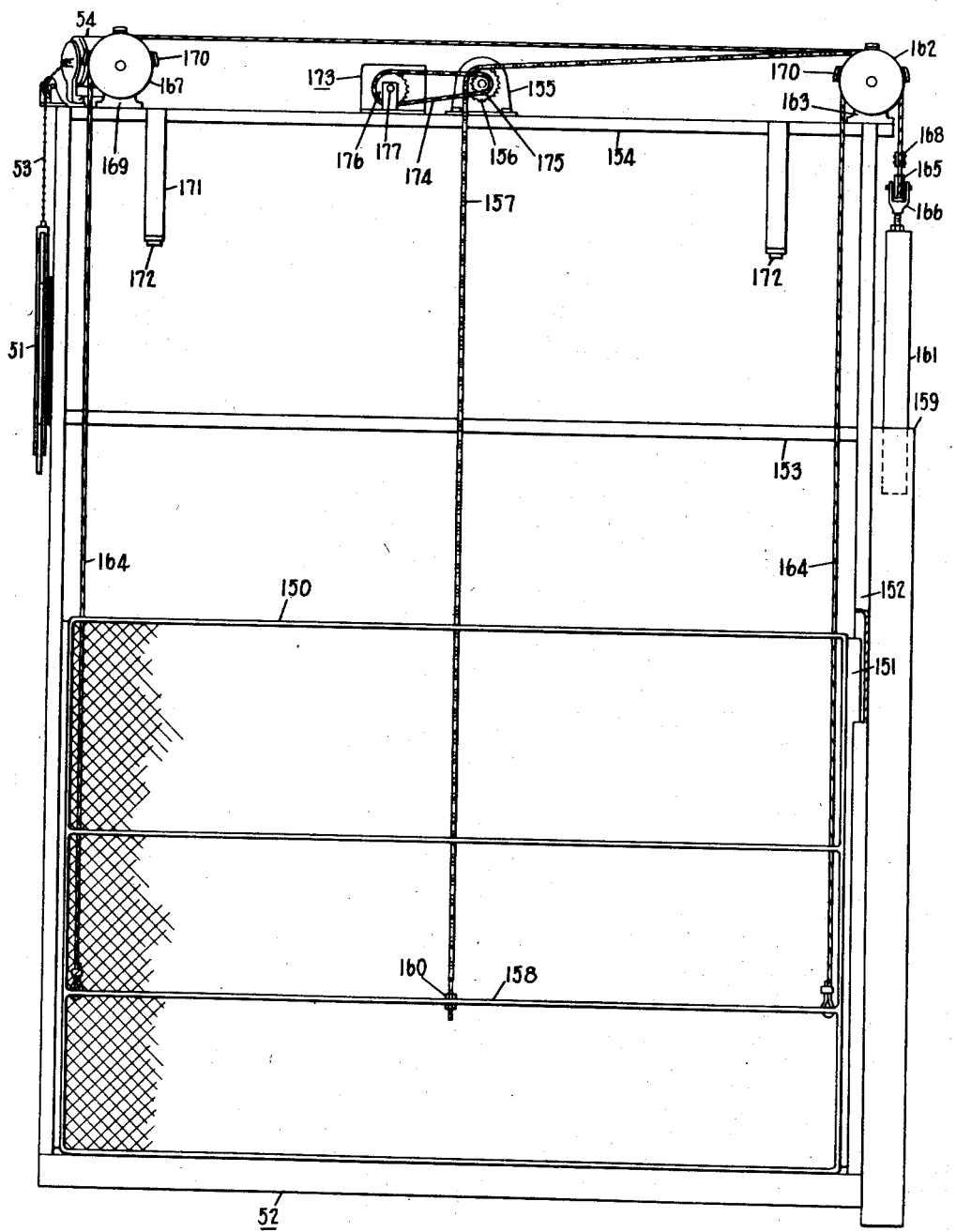
Figure 3 is a schematic view in front elevation of the car gate and operating mechanism therefor illustrated in Figure 1.

Referring now to Figure 3, operating mechanism for a car gate which may be used in conjunction with the operating mechanism for the door will be described. The gate, designated 150, has angle members 151 secured to the sides of the gate for cooperating with vertical channels 152 secured to the car frame 153 to guide the gate in its movement. A channel 150 extends across the top of the car upon which is mounted the motor 155 which provides the power for operating the gate. This motor, like door operating motor 100, is geared down and has a sprocket 156 on the end of its driving shaft. This sprocket drives a sprocket chain 157 which extends downwardly from the sprocket and has its end attached to a cross member 158 of the gate at 160. The other end of the chain is attached to a counterbalance 161, the chain passing from the sprocket over an idler wheel 162, mounted in a bracket 163 secured to channel 154, and thence downwardly to the counterbalance. A protecting chute 159 is provided for the counterbalance, into which the counterbalance descends as the gate is raised. This chute is secured to the car framework.

To provide against tilting of the gate in its plane about its point of connection 160 to chain 157, the ends of a rope 164 are secured to cross member 158, one end on each side of the gate. The rope extends upwardly from its right hand end around idler wheel 162, thence downwardly and around a grooved ring 165 secured by a yoke 166 to the counterbalance, thence upwardly around idler wheel 162 across the car and over another idler wheel 167 and down to cross member 158. Plates 168 extend across the two leads of rope 164 above ring 165 and are clamped thereto. The end of chain 157 is secured to these plates, thereby effecting the connection of the chain to the counterbalance. The idler wheel 162 has three grooves to accommodate the rope and chain. Idler wheel 167 is mounted in a bracket 169 secured to channel 154. Each idler wheel mounting bracket is provided with a plurality of lugs 170 which form rope guards. Stop brackets 171 are secured to channel 154 near each side of the car and extend downwardly therefrom. Rubber bumpers 172 are secured to the bottoms of the brackets and are engaged by the cross member 158 to bring the gate to a stop in open position. Switching mechanism 173 for controlling the operation of motor 155 is driven from the motor by a sprocket chain 174. This chain passes about a driving sprocket 175 on the motor driving shaft and a driven sprocket 176 on the shaft 177 of the switching mechanism. The switching mechanism is mounted on channel 154 and is of the same construction as switching mechanism 118.

In the operation of the gate, motor 155 is energized to effect clockwise rotative movement of sprocket 156 to lift the gate to open position. Counterbalance 161 acts during this operation to minimize the load on the motor, while the connections to the counterbalance effected by rope 164 act to avoid tilting of the gate during its normal operation. As the gate reaches open position it is brought to a stop against bumpers 172. Motor 155 is energized for opposite rotative movement to effect the closing of the gate. Thus, upon opposite rotative movement of sprocket 156, the counterbalance is pulled upwardly, permitting the gate to close by its own weight. As the gate reaches closed position it is brought to a stop against the floor of the car. Operation of motor 155 during opening and closing is controlled by switching mechanism 173 in the same manner as switching mechanism 118 controls the operation of motor 100 during operation of the door. This will be more readily understood from a description of the wiring diagram which will follow. Also, the gate and door may be arranged for operation in a given sequence, as will also be explained in connection with a description of the wiring diagram.

Referring now to Figure 4, the circuits of the wiring diagram are shown in "straight" or "across the line" form, in which the coils and contacts of the various electromagnetic switches are separated in such manner as to render the circuits as simple and direct as possible. The relationship of these coils and contacts may be seen from Figure 4s, where the switches are arranged in alphabetical order and shown in spindle form. The positions of these coils and contacts on the wiring diagram may be found by referring to Figure 4s, where these coils and contacts are arranged on the spindles in horizontal alignment with the corresponding elements of the wiring diagram.

A direct current installation is illustrated in which the door operating motors 100 and gate operating motor 155 are direct current motors. The circuits are shown for a three-floor installation, the arrangement of the door operating mechanism being the same for each floor. In order to differentiate between the operating mechanism for each floor, numbers indicative of the floor and arranged in brackets will be appended to the reference characters employed to designate the elements. The contacts of switch units 83 and 86 for each floor, with the exception of the interlock contacts which are not shown, are designated DLA, DLF and DLP. The contacts of switching mechanism 118 for each floor are designated DSC, DCL, DSO and DOL, contacts DSC and DCL serving respectively as door close first slow down contacts and door close second slow down contacts and contacts DSO and DOL serving respectively as door open first slow down contacts and door open second slow down contacts. The armature of the door operating motor 100 for each floor is designated DMA and its field winding DMF. The contacts of switching mechanism 173 are designated GSC, GCL, GSO and GOL, serving as gate close first slow down contacts, gate close second slow down contacts, gate open first slow down contacts and gate open second slow down contacts respectively. The armature of the gate operating motor 155 is designated GMA and its field winding GMF. The door close buttons at the floors are designated HCL, while the door close button in the car is designated CCL. The door open buttons at the floors are designated HOP, while the door open button in the car is designated COP. The door open buttons HOP may be provided with auxiliary contacts HAP to prevent unwanted circuits. Resistances for controlling the operation of the door operating motors are common to the motors and are designated DMR, with differentiation had by appended reference characters. The resistances for controlling the operation of the gate operating motor are designated GMR with differentiation had by appended reference characters. Various control resistances are employed and will be referred to later. Condensers are designated CA.

The electromagnetic switches are designated as follows:

AC—accelerating switch
CM—cam relay
CX—auxiliary slow down relay
DA—door close second slow down switch
DB—door open second slow down switch
DC—door close switch
DE—door first slow down switch
DO—door open switch
EX—auxiliary slow down relay
GA—gate close second slow down switch
GB—gate open second slow down switch
GC—gate close switch
GE—gate first slow down switch
GO—gate open switch
H—up and down switch
OA—automatic opening relay
OX—auxiliary opening relay
PT—protective time relay
ZR—door lock relay Throughout the description which follows, these letters will be applied to the coils of the above designated switches. Also, with reference numerals appended thereto, they will be applied to the contacts of these switches. The coils of relay CM and switch H are not shown, these coils being arranged in the elevator motor control circuits, which are not shown. Control of the elevator by push buttons, one at each floor and one in the car for each floor, will be assumed. The circuits are illustrated for the condition with the car at the first floor with the car gate and hatchway door closed and the door unlocked. All electromagnetic switches are shown in deenergized condition.

Upon power being supplied to the direct current supply lines L1 and L2, the coil of protective time relay PT is energized through contacts OX4, CX3, DC2 and GC2, causing this relay to be operated. Also the coil of accelerating switch AC is energized through contacts EX1 and PT1, causing this switch to be operated. The gate operating motor field winding GMF is energized through resistance GFR and the field winding DMF1 of the door operating motor at the first floor is energized through resistance ZRR and the coil of door lock relay ZR. Relay ZR is thus operated. Also the coil of switch DB is energized through contacts DOL3, DOL2 and DOL1 and the coil of switch GB is energized through contacts GOL, causing these switches to be operated.

Incident to the starting of the car in response to the pressing of a control button, contacts CM1 close to energize cam magnet 54. This retracts the cam, causing the locking of the first floor door and the separation of contacts DLA1, DLF1 and DLP1. The separation of contacts DLF1 breaks the circuit for field winding DMF1 and also the coil of relay ZR which drops out. After the engagement of the door interlock contacts (not shown) upon the locking of the door, switch H operates to engage contacts H1 and separate contacts H2. The engagement of contacts H1 completes a circuit for the coil of automatic opening relay OA, causing this relay to operate. The car is started upon operation of switch H and goes toward the floor corresponding to the elevator control button pressed.

Assume that the destination of the car is the second floor. As it arrives at that floor, contacts CM1 and H1 separate and contacts H2 engage. Relay OA does not drop out immediately upon separation of contacts H1, being delayed by the discharge of condenser CA1 through resistance OAR and the coil of the relay. Thus, upon the reengagement of contacts H2, a circuit is completed through contacts CX1 and OA2 for the coil of auxiliary opening relay OX. Relay OX separates contacts OX3 to prevent energization of the coils of switches DC and GC and relay CX. Relay OX also separates contacts OX4, deenergizing the coil of protective time relay PT. Relay PT does not drop out immediately, however, owing to the discharge of condenser CA5 through resistance PTR and the coil of the relay, this delay being for a sufficient time to insure the opening of the door and gate. The separation of contacts CM1 deenergizes cam magnet 54, which permits the cam to be extended to unlock the second floor door. Upon the door being unlocked, contacts DLF2 for the second floor engage, completing a circuit for field winding DMF2 for the door operating motor for the second floor door. Also, contacts DLA2 engage, preparing the circuit for the armature DMA2 of the door operating motor 100 for the second floor door. In this way the second floor door operating motor is selected for operation. The circuit through field winding DMF2 also extends through the coil of door lock relay ZR.

This relay operates to engage contacts ZR1, completing a circuit through contacts H2, CX1, OA1 and PT1 for the coil of door open switch DO. Contacts OA1 are by-passed by contacts DB1 and OX1 so that switch DO is maintained operated after relay OA drops out. A circuit is not completed at this time for the coil of gate open switch GO as contacts DB2 are separated.

Switch DO upon operation engages contacts DO1, DO2, DO3 and DO4. Contacts DO1 complete the circuit through contacts DSO3, DSO2 and DSO1 of switching mechanism 118 for the second floor door for the coil of door first slow down switch DE. Switch DE separates contacts DE2 and DE3 and engages contacts DE1 and DE4. Contacts DE2 open the by-pass circuit for the motor armature. Contacts DE1 complete the circuit for the coil of auxiliary slow down relay EX which, in turn, separates contacts EX1 to break the circuit for the coil of accelerating switch AC. Switch AC does not drop out immediately, due to the discharge of condenser CA4 through resistance ACR and the coil. Contacts DO2 by-pass contacts OA2 to maintain relay OX operated after relay OA drops out. Contacts DO3 and DO4 complete the circuit for the armature DMA2 of door operating motor 109 for the second floor door. This circuit is through resistances DMR, DMR1 and DMR2, contacts DE4, DO4 and DLA2, armature DMA2, and contacts DO3 and PT2. The field winding of the motor being energized, the motor starts in operation to pull the door sections to open position.

Upon the expiration of a certain time delay after the motor starts in operation, the accelerating switch drops out, engaging contacts AC4 to short-circuit resistance DMR2. This increases the voltage applied to the motor armature, increasing the speed of the door opening operation. During the initial movement of the door, contacts DCL2 engage to complete the circuit for the coil of door close second slow down switch DA, causing this switch to operate. As the sections near open position and arrive at a certain distance therefrom, door open first slow down contacts DSO2 of the second floor door operating motor control switching mechanism 118 open, breaking the circuit for the coil of door first slow down switch DE. This switch drops out to separate contacts DE1 and DE4 and to engage contacts DE2 and DE3. The separation of contacts DE1 breaks the circuit for the coil of auxiliary slow down relay EX which engages contacts EX1 to complete the circuit for the coil of accelerating switch AC, causing this switch to operate. The engagement of contacts DE3 short-circuits resistances DMR1 and DMR2, but the separation of contacts DE4 inserts resistance DMR3 of higher value in circuit with armature DMA2. The engagement of contacts DE2 connects by-pass resistance DMR5 across armature DMA2, the circuit being through contacts DA3 and DB4. The insertion of resistance DMR3 in circuit with the motor armature and the connection of the by-pass resistance across the armature causes the motor to slow down.

As the door sections reach a point still closer to fully open position, door open second slow down contacts DOL2 of the second floor door operating motor control switching mechanism 118 open, breaking the circuit for the coil of door open second slow down switch DB. This switch drops out to separate contacts DB1 and DB4 and to engage contacts DB2 and DB3. The separation of contacts DB4 and the engagement of contacts DB3 connects resistance DMR4 of lower value across armature DMA2 in place of resistance DMR5, causing further slow down of the motor. The separation of contacts DB1 breaks the circuit for the coil of switch DO. Switch DO does not drop out immediately, being delayed by the discharge of condenser CA2 through resistance DOR and its coil sufficiently to insure the door sections reaching fully open position. The door sections are brought to a stop by the engagement of the truckable sill with its stops as the door reaches open position. Upon the expiration of the time interval provided for switch DO, this switch drops out separating contacts DO3 and contacts DO4 to disconnect armature DMA2 from the supply lines.

The engagement of contacts DB2 completes a circuit for the coil of gate open switch GO. This circuit is through contacts H2, CX1, GB1, OX2 and DB2, coil GO, and contacts ZR1 and PT1. Switch GO upon operation engages contacts GO1, GO2, GO3 and GO4. Contacts GO1 complete the circuit through contacts GSO of switching mechanism 173 for the coil of gate first slow down switch GE. Switch GE separates contacts GE2 and GE3 and engages contacts GE1 and GE4. Contacts GE2 open the by-pass circuit for the motor armature. Contacts GE1 complete the circuit for the coil of auxiliary slow down relay EX. Relay EX separates contacts EX1 to break the circuit for the coil of accelerating switch AC which as before does not drop out immediately. Contacts GO2 by-pass contacts DO2 to maintain relay OX operated after switch DO drops out. Contacts GO3 and GO4 complete the circuit for the armature GMA of gate operating motor 155, this circuit being through resistances GMR, GMR1 and GMR2, contacts GE4 and GO4, armature GMA, and contacts GO3 and PT2. The field winding of the motor being energized, the motor starts in operation to lift the gate to open position.

Upon the expiration of a certain time delay after the motor starts in operation, the accelerating switch drops out, engaging contacts AC3 to short-circuit resistance GMR2. This increases the voltage applied to the motor armature, increasing the speed of the gate opening operation. During the initial movement of the gate, contacts GCL close to complete the circuit for the coil of gate close second slow down switch GA, causing this switch to operate. As the gate arrives at a certain distance from open position, gate open first slow down contacts GSO of switching mechanism 173 open, breaking the circuit for the coil of gate first slow down switch GE. This switch drops out to separate contacts GE1 and GE4 and to engage contacts GE2 and GE3. The separation of contacts GE1 breaks the circuit for the coil of auxiliary slow down relay EX which engages contacts EX1 to complete the circuit for the coil of accelerating switch AC, causing this switch to operate. The engagement of contacts GE3 short-circuits resistances GMR1 and GMR2 but the separation of contacts GE4 inserts resistance GMR3 of higher value in circuit with armature GMA. The engagement of contacts GE2 connects by-pass resistance GMR5 across armature GMA, the circuit being through contacts GA3 and GB3. The insertion of resistance GMR3 in circuit with the motor armature and the connection of the by-pass resistance across the armature causes the motor to slow down.

As the gate reaches a certain point still closer to fully open position, gate open second slow down contacts GOL open, breaking the circuit for the coil of gate open second slow down switch GB. This switch drops out to separate contacts GB1 and GB3 and to engage contacts GB2. The separation of contacts GB3 and the engagement of contacts GB2 connect resistance GMR4 of lower value across armature GMA in place of resistance GMR5, causing further slow down of the motor. The separation of contacts GB1 breaks the circuit for the coil of switch GO. Switch GO does not drop out immediately, being delayed by the discharge of condenser CA3 through resistance GOR and its coil sufficiently to insure the gate reaching fully open position. As the gate reaches open position it engages bumpers 172 and is brought to a stop. Upon the expiration of the time interval provided for switch GO, this switch drops out separating contacts GO3 and contacts GO4 to disconnect armature GMA from the supply lines. Also contacts GO2 separate, breaking the circuit for the coil of relay OX which drops out. The reengagement of contacts OX4 reestablishes the circuit for the coil of relay PT to maintain contacts PT1 and PT2 in engagement.

Assume that the car was called to the second floor to take on a load. After the load is taken on the car, the operator closes the car gate and hatchway door by pressing and holding pressed door close button CCL in the car. Had the car been sent to the second floor to discharge its load, the closing operation after the load is removed would be effected by pressing and holding pressed door close button HCL2 at the second floor, this button being rendered "alive" by contacts DLP2 in engagement under the conditions assumed. The pressing of the door close button completes a circuit for the coils of gate close switch GC and auxiliary slow down relay CX, this circuit including contacts H2, OX3, AC2 and, in the case of switch GC, also contacts PT1. The circuit for the coil of switch DC is not completed at this time as contacts GA1 are separated. Relay CX upon operation engages contacts CX2 and separates contacts CX1 and CX3. Contacts CX2 establish a by-pass circuit for contacts AC2 to maintain the coils of switch GC and relay CX energized when the accelerating switch drops out. The separation of contacts CX1 prevents energization of the coils of switches DO and GO and relay OX. The separation of contacts CX3 deenergizes the coil of relay PT, which as above described is maintained operated by the discharge of condenser CA5.

Switch GC, upon operation, engages contacts GC1, GC3 and GC4 and separates contacts GC2. Contacts GC1 complete the circuit through contacts GSC of switching mechanism 173, which were closed during opening of the gate, for the coil of gate first slow down switch GE. Switch GE separates contacts GE2 and GE3 and engages contacts GE1 and GE4. Contacts GE2 open the by-pass circuit for the motor armature. Contacts GE1 complete the circuit for the coil of relay EX, which separates contacts EX1 to break the circuit for the coil of switch AC. Contacts GC3 and GC4 complete the circuit for armature GMA of the gate operating motor. This circuit is through resistances GMR, GMR1 and GMR2, contacts GE4 and GC3, armatures GMA and contacts GC4 and PT2. This causes current to flow through the armature in a direction reverse to that for effecting the gate opening operation, thereby effecting reverse rotative movement of the motor to lift the gate counterbalance and thus permit the gate to return to closed position.

Upon the expiration of the time delay of the accelerating switch, contacts AC3 engage to short-circuit resistance GMR2 to increase the speed of the gate closing operation. Switch AC also separates contacts AC2 but the circuit for the coils of switch GC and relay CX is maintained through contacts CX2. As the gate arrives at a certain distance from closed position, gate close first slow down contacts GSC open, breaking the circuit for the coil of switch GE. As a result, contacts GE1 separate to deenergize relay EX and thus effect the reoperation of switch AC. The engagement of contacts GE3 and separation of contacts GE4 effects the substitution of resistance GMR3 for resistance GMR1 in circuit with the motor armature. Contacts GE2 connect by-pass resistance GMR5 across the motor armature, the circuit being through contacts GA3 and GB3. The insertion of resistance GMR3 in circuit with the armature and connection of resistance GMR5 across the armature causes the motor to slow down. As the gate reaches a certain point still closer to fully closed position, gate close second slow down contacts GCL open, breaking the circuit for the coil of gate close second slow down switch GA. Switch GA drops out to separate contacts GA3 and to engage contacts GA1 and GA2. The separation of contacts GA3 and engagement of contacts GA2 connect resistance GMR6 of lower value across the motor armature in place of resistance GMR5, causing further slow down of the motor. Thus the gate is brought to fully closed position at a slow speed where it is brought to a stop by the engagement of the bumpers on the gate with the car floor.

The engagement of contacts GA1 completes the circuit for the coil of door close switch DC, this circuit being through contacts H2, the door close button, contacts OX3, AC2, GA1, coil of switch DC, and contacts ZR1 and PT1. Switch DC upon operation engages contacts DC1, DC3 and DC4 and separates contacts DC2. Contacts DC1 complete the circuit through contacts DSC2, closed during the opening of the door, for the coil of switch DE. Switch DE acts through relay EX to break the circuit for the coil of switch AC. Contacts DE2 open the by-pass circuit for the motor armature. Contacts DC3 and DC4 complete the circuit for armature DMA2 of operating motor 100 for the second floor door, this circuit extending through resistances DMR, DMR1 and DMR2. This causes current to be supplied to the motor armature in a direction reverse to that for door opening, causing operation of the motor to lift the lower door section and thus permit lowering of the upper section by its own weight, thereby effecting closing of the door.

Upon the expiration of the time delay of the accelerating switch, contacts AC4 engage to short-circuit resistance DMR2 to increase the speed of the door closing operation. As the door sections arrive at a certain distance from closed position, door close first slow down contacts DSC2 open, breaking the circuit for the coil of switch DE. This switch drops out, separating contacts DE1 to cause, through effecting the dropping out of relay EX, the operation of accelerating switch AC. Also, contacts DE3 engage and contacts DE4 separate to substitute resistance DMR3 of higher value for resistance DMR1 in circuit with armature DMA2. Contacts DE2 connect by-pass resistance DMR5 across armature DMA2, the circuit being through contacts DA3 and DB4. Thus the motor is caused to slow down. As the door sections reach a point still closer to fully closed position, door close second slow down contacts DCL2 open, breaking the circuit for the coil of door close second slow down switch DA. This switch drops out to engage contacts DA1 and DA2 and to separate contacts DA3. The separation of contacts DA3 and engagement of contacts DA2 substitute resistance DMR6 of lower value for resistance DMR5 in the by-pass circuit for the motor armature, causing further slow down of the motor. Thus the door sections are brought together at a slow speed. Upon the door becoming fully closed, the operated door close button is released, deenergizing the coils of switch DC, switch GC and relay CX. The dropping out of switch GC disconnects the armature of the gate operating motor from the supply lines. Also, the dropping out of switch DC disconnects motor armature DMA2 from the supply lines.

Should a control push button for the elevator car have been pressed, contacts CM1 would be in engagement so that upon the reengagement of contacts DA1 retiring cam magnet 54 would be energized, retracting the cam and locking the door and causing the starting of the car to the floor corresponding to the control button pressed. Should no control button have been operated, the car remains at the floor with the car gate and hatchway door closed but not locked. The door and gate may be reopened by pressing the door open button HOP2 at the second floor, completing a circuit through contacts H2, DLP2 and AC1 for the coil of automatic opening relay OA which operates as previously described to cause the door and gate to move to open positions.

It is to be noted that in pressing a door open button at a landing the auxiliary contacts HAP of that button are opened. This prevents the establishment of an unwanted circuit in the event that other buttons are pressed at the same time. Assume, for example, that some one at the third floor is pressing both the door close button HCL3 and the door open button HOP3 at the time that door open button HOP2 is pressed. The separation of auxiliary contacts HAP3 of the third floor door open button prevents the establishment of an unwanted feed for door close button HCL3 and thus prevents interference with the desired operation of the door and gate. The door and gate may also be opened from within the car by pressing door open button COP.

From the above description of operation, it will be seen that as the car comes to a stop at a floor, the door at that floor and the car gate open automatically. The door and gate are closed by pressing a door close button, either in the car or at the landing at which the car is stopped. The door and gate may be reopened by pressing the door open button at that floor or the door open button in the car. In the case of the closing operation, the door close button must be held pressed until both the gate and door reach fully closed positions, whereas in the opening operation in response to a door open button, the button upon being pressed may be released as a holding circuit is established. The door and gate are operated in sequence, with the door first in opening and the gate first in closing. However, they may be operated together if desired. This, in the control system illustrated, may be effected by omitting contacts DB2 in the case of the opening operation and by omitting contacts GA1 in the case of the closing operation.

The door and gate are slowed down prior to being brought to a stop both in opening and closing. In the opening operation, the coils of the switches controlling the supply of power to the operating motors are respectively disconnected from the supply lines as the door and gate respectively arrive within a certain distance from open position. Each switch is timed in dropping out to allow ample time for the door and gate to reach fully open position. Should either the door or gate fail to reach fully open position after the disconnection of its open switch from the supply lines, its operating motor may be reenergized to complete the operation by pressing the door open button in the car or the door open button at the landing. This reestablishes the circuit for the coil of relay OA, which reestablishes the circuit for the coils of switches DO and GO and by holding the button pressed, these switches are maintained energized to insure the completion of the opening operation.

If during the closing operation the door close button is released prematurely or it becomes necessary to release the button to stop the closing operation, as where some one might be struck by the door or gate, the closing operation may be resumed by repressing the door close button and holding it pressed until the full closing of the gate and door is effected. It is to be noted that on the release of the door close button during the closing of the gate the separation of contacts GC3 and GC4 disconnects the gate motor armature from the supply lines and the separation of contacts GC1 deenergizes switch GE, which connects resistance across the gate motor armature to bring the motor to a stop by dynamic braking. Similarly, if the button is released during the closing of the door, the separation of contacts DC3 and DC4 disconnects the door motor armature from the supply lines and the separation of contacts DC1 deenergizes switch DE, which connects resistance across the door motor armature to bring the motor to a stop by dynamic braking.

Protective time relay PT is set to hold in after the circuit for its coil is broken until ample time has elapsed for the opening of door and gate or the closing thereof to be effected. If in the automatic opening of the door and gate or the opening thereof in response to a door open button, the opening of the door and gate is not effected within the time interval of relay PT, this relay in dropping out separates contacts PT2 to break the circuit connecting the armatures GMA of the gate operating motor and DMA of the door operating motor to the supply lines. Also, contacts PT1 separate to disconnect the operated opening switch from the supply lines. In such event, the opening operation may be completed by pressing the door open button in the car or the door open button at the landing. It is to be noted that upon the dropping out of switch DO or switch GO upon the separation of contacts PT1, relay OX is deenergized, which engages contacts OX4 to reestablish the circuit for the coil of relay PT. Relay PT again operates, engaging contacts PT1 and PT2 to permit the circuit for the opening operation to be established by the door open button and the time interval of relay PT is again provided in which to complete the opening operation. In a similar manner, should the closing of the door and gate be not effected within the time interval provided by relay PT, contacts PT2 separate to deenergize the armatures of the operating motors and contacts PT1 separate to disconnect the operated closing switches from the supply lines. In such event, the closing operation may be completed by releasing and repressing the door close button. The release of the button deenergizes the coil of relay CX. Relay CX in dropping out engages contacts CX3 to reestablish the circuit for the coil of relay PT. Relay PT reengages contacts PT1 and PT2 to permit the establishment of the closing circuits upon repressing the door close button and the resultant reseparation of contacts CX3 upon the button being pressed disconnects the coil of relay PT from the supply lines to reestablish the time interval in which the completion of the closing operation may be effected. Contacts DC2 and GC2 maintain relay PT deenergized in the event that either switch DC or switch GC respectively should fail to fall out upon deenergization of its coil. Similarly, should either switch DO or GO fail to fall out upon the expiration of its time interval after deenergization of its coil, its contacts DO2 or GO2 respectively maintain relay OX energized and thus contacts OX4 separated, thereby maintaining relay PT deenergized.

Thus the doors and gate are controlled in a very reliable manner. Although alternating current motors may be employed for operating the doors and gate, it is preferred to employ direct current motors. With direct current motors, the doors and gate may be operated quickly and slowed down at the desired rate to a slow speed from which they are brought to a stop. With this arrangement, the torque of the motor is so low at slow speed in closing that the door may be stopped by hand. Thus, the possibility of any serious injury due to some one getting his arm caught, for example, between the closing sections, is minimized. The door motors are picked out by switches operated by the retiring cam for the door lock, thereby not only insuring the unlocking of the door before power is applied for effecting the opening operation but also insuring that only the door operating motor for the door at the floor at which the car is stopped will be energized. Also, by the locking arrangement provided the door interlock contacts cannot be made until the door is closed and locked even though the retiring cam be retracted before the door is fully closed. The motors for both the doors and gate are controlled by switching mechanisms arranged as units individual to the motors and operated by the motors themselves, thereby insuring the desired control of the operation of the door and gate, regardless of the condition of one with respect to the other.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In an elevator system in which a gate is provided on the elevator car and a vertically operable hatchway door is provided at each floor, a direct current motor for operating the car gate, a direct current motor for each door for operating that door, switching mechanism for each of said floors for selecting for operation the operating motor for the door at the floor at which the car is stopped, resistance part of which is adapted for connection in series with the gate operating motor armature and part for connection across that armature, additional resistance part of which is adapted for connection in series with the armature of the selected one of such motors and part for connection across the armature thereof, switching mechanism for said gate operating motor operable as the gate arrives at a certain distance from the position to which it is being moved for causing a portion of said resistance for such motor to be connected across the armature thereof with a portion of such resistance in series with such armature to slow down the motor, and switching mechanism for each of said door operating motors, said last named switching mechanism for said selected door operating motor being operable as the door operated thereby arrives at a certain distance from the position to which it is being moved for causing a portion of said resistance for the door operating motors to be connected across the armature of such motor with a portion of such resistance in series with such armature to slow down the motor.

2. In an elevator system in which a gate is provided on the elevator car and a vertical biparting counterbalanced hatchway door is provided at each floor, a direct current motor for operating the car gate, a direct current motor for each door for operating that door, switching mechanism for each of said floors for selecting for operation the operating motor for the door at the floor at which the car is stopped, resistance for said gate operating motor, part of which is adapted for connection in series with the armature thereof and part for connection across the armature thereof, resistance for said door operating motors, part of which is adapted for connection in series with the armature of the selected one of such motors and part for connection across the armature thereof, switching mechanism for said gate operating motor operable as the gate arrives at a certain distance from the position to which it is being moved for causing a portion of said resistance for such motor to be connected across the armature thereof with a portion of such resistance in series with such armature to slow down the motor, timed switching mechanism for thereafter causing the deenergization of the armature of said gate operating motor, switching mechanism for each of said door operating motors, said last named switching mechanism for said selected door operating motor being operable as the door operated thereby arrives at a certain distance from the position to which it is being moved for causing a portion of said resistance for the door operating motors to be connected across the armature of such motor with a portion of such resistance in series with such armature to slow down the motor, and timed switching mechanism for thereafter causing the deenergization of the armature of said selected door operating motor.

3. In an elevator system in which a gate is provided on the elevator car and a vertical biparting counterbalanced hatchway door is provided at each floor, a direct current motor for operating the car gate, a direct current motor for each door for operating that door, switching mechanism for each of said floors for selecting for operation the operating motor for the door at the floor at which the car is stopped, resistance for said gate operating motor adapted for connection in series with the armature thereof, additional resistance for said gate operating motor adapted for connection across the armature thereof, resistance common to said door operating motors adapted for connection in series with the armature of any one of them, additional resistance common to door operating motors adapted for connection across the armature of any one of them, switching mechanism operable by said car gate operating motor as the gate arrives at a certain distance from the position to which it is being moved for causing said first named resistance for such motor to be inserted in series with the armature thereof and said second named resistance for such motor to be connected across the armature thereof to slow down the motor and as the gate arrives at a certain less distance from such position for causing the value of said second named resistance for such motor to be decreased to further slow down the motor, timed switching mechanism for causing the deenergization of the armature of said gate operating motor upon the expiration of a predetermined time interval after the gate arrives at said certain less distance from such position, switching mechanism for each of said door operating motors, said last named switching mechanism for said door operating motor for the floor at which the car is stopped being operable by such motor as the door arrives at a sertain distance from the position to which it is being moved for causing said first named resistance for such motor to be inserted in series with the armature thereof and said second named resistance for said motor to be connected across the armature thereof to slow down the motor and as the door arrives at a certain less distance from such position for causing the value of said second named resistance for said motor to be decreased to further slow down the motor, and timed switching mechanism common to said door operating motors for causing the deenergization of the armature of said door operating motor for the floor at which the car is stopped upon the expiration of a predetermined time interval after such door arrives at said certain less distance from such position.

4. In an elevator system in which a vertical bi-parting counterbalanced hatchway door is provided at each floor, a direct current operating motor for each door, each motor having an armature and a separately excited field winding, switching mechanism for each of said floors for selecting both the field winding and armature of the operating motor for the door at the floor at which the car is stopped for energization, a door lock for each of said doors, each door lock having an operating lever and roller carried by said lever, a retiring cam carried by the car, an electromagnet carried by said car adapted upon energization to retract said cam, means operable as the car arrives at a floor at which it is to be stopped for deenergizing said electromagnet to release said cam, said cam upon being released engaging said roller on said operating lever for said door lock for the door for such floor to operate said lock to unlock such door, and means responsive to operation of the operating lever of a door lock to unlock the door for which such lock is provided for causing operation of said switching mechanism for the floor for which such door is provided to select for energization the field winding and armature of the operating motor for such door.

5. In an elevator system in which closure means is provided for controlling access to and from the elevator car at a floor, electric direct current motive means for operating said closure means, a close push button, means responsive to the pressing and holding pressed of said close push button for causing operation of said motive means to close said closure means, and means for dynamically braking said motive means upon release of said close push button before the closure means reaches closed position.

6. In an elevator system in which closure means is provided for controlling access to and from the elevator car at a floor, electric direct current motive means for operating said closure means, a close push button, means responsive to the pressing and holding pressed of said close push button for causing operation of said motive means to close said closure means, means for automatically causing dynamic braking of said motive means upon said closure means arriving at a certain distance from fully closed position, and means for causing dynamic braking of said motive means should said close push button be released before said closure means arrives at said certain distance from fully closed position.

7. In an elevator system in which closure means is provided for controlling access to and from the elevator car at a floor, electric direct current motive means for operating said closure means, a close push button, means responsive to the pressing and holding pressed of said close push button for causing operation of said motive means to close said closure means, and means for automatically causing dynamic braking of said motive means upon said closure means arriving at a certain distance from fully closed position.

8. In an elevator system in which closure means is provided for controlling access to and from the elevator car at a floor, electric motive means for operating said closure means, a close push button, means responsive to the pressing and holding pressed of said push button for causing operation of said motive means to close said closure means, and protective means for causing deenergization of said motive means in the event said push button is held pressed for a certain time interval.

9. In an elevator system in which closure means is provided for controlling access to and from the elevator car at a floor, electric motive means for operating said closure means, a close push button, means responsive to the pressing and holding pressed of said push button for causing operation of said motive means to close said closure means, protective means for causing deenergization of said motive means in the event that said closure means is not closed within a certain time interval after the pressing of said button, and means for thereafter preventing reenergization of said motive means for completing the closing of said closure means unless said push button is released and repressed.

10. In an elevator system in which closure means is provided for controlling access to and from the elevator car at a floor, a source of current, electric motive means for operating said closure means, an electromagnetic switch to control the application of power to said motive means to open said closure means, means operable as the car is brought to a stop at said floor for causing connection of the coil of said switch to said source to operate said switch to cause operation of said motive means to effect opening of said closure means, means controlled by said closure means and operable as said closure means arrives at a certain distance from fully open position for causing disconnection of said coil from said source, means for thereafter delaying the dropping out of said switch to maintain said motive means energized for a predetermined time interval, an open push button, and means responsive to the pressing of said push button for causing reenergization of said motive means to effect the full opening of said closure means in the event that said motive means fails to move said closure means to fully open position within said time interval.

11. In an elevator system in which closure means is provided for controlling access to and from the elevator car at a floor, a source of current, electric motive means for operating said closure means, an electromagnetic switch, means for connecting the coil of said switch to said source to cause the application of power to said motive means to operate said closure means, means for disconnecting said coil of said switch from said source as said closure means reaches a certain position, and a protective time relay controlled by said switch and operable to prevent further application of power to said motive means in the event said switch has not opened at the expiration of the time interval of said time relay.

12. In a control system for a door operator for an elevator serving a plurality of floors wherein each floor is provided with a door having an upper section and a lower section vertically and oppositely movable on a pair of guides by a pair of flexible connectors to close an opening in a hatchway wall; a switch device; means responsive to operation of said switch device for moving any of said doors one at a time, said one door being that of the floor at which said elevator is positioned; a series of switches; one associated with each of said doors, and means responsive to movement of each of said doors for actuating the associated switch; a circuit connecting in series relation each of said series of switches; and means responsive to the opening of said circuit for altering the speed of movement of the door of the floor at which said elevator is standing.

CLIFFORD NORTON.
PHILIP KARMEL.